United States Patent [19]
Muncheryan

[11] 3,786,907
[45] Jan. 22, 1974

[54] LASER ERASER FOR A TYPEWRITER

[76] Inventor: Hrand M. Muncheryan, 1735 Morningside St., Orange, Calif. 92667

[22] Filed: Sept. 22, 1971

[21] Appl. No.: 182,597

[52] U.S. Cl. .............................. 197/181, 331/94.5
[51] Int. Cl. ............................................ B41j 29/16
[58] Field of Search .. 197/181; 331/94.5 A, 94.5 D, 331/94.5 H, 94.5 P

[56] References Cited
UNITED STATES PATENTS

| | | | |
|---|---|---|---|
| 3,553,421 | 1/1971 | Schawlow | 197/181 UX |
| 3,624,545 | 11/1971 | Ross | 331/94.5 P |
| 3,631,362 | 12/1971 | Almasi et al. | 331/94.5 P |
| 3,500,231 | 3/1970 | Tomiyasu et al. | 331/94.5 P |
| 3,356,966 | 12/1967 | Miller | 331/94.5 P |
| 3,392,259 | 7/1968 | Meier | 331/94.5 A X |
| 3,248,671 | 4/1966 | Dill et al. | 331/94.5 H |
| 3,464,534 | 9/1969 | Muncheryan | 197/181 |
| 2,107,209 | 2/1938 | O'Neal | 197/181 |
| 2,189,649 | 2/1940 | Hutaff | 197/181 |
| 3,039,435 | 6/1962 | Meyer | 197/181 X |
| 3,341,787 | 9/1967 | Biard et al. | 331/94.5 P |
| 3,349,339 | 10/1967 | Thorington | 331/94.5 P |
| 3,404,350 | 10/1968 | Muncheryan | 331/94.5 D |
| 3,413,567 | 11/1968 | Hannwacker et al. | 331/94.5 P |
| 3,478,278 | 11/1969 | Muncheryan | 331/94.5 D |
| 3,487,332 | 12/1969 | Cordy | 331/94.5 P |
| 3,495,140 | 2/1970 | Cornely et al. | 331/94.5 H |
| 3,516,011 | 6/1970 | Hadwin | 331/94.5 D |
| 3,619,809 | 11/1971 | Ozzimo et al. | 331/94.5 P |
| 3,646,474 | 2/1972 | Segre | 331/94.5 P |
| 3,655,986 | 4/1972 | Lax | 331/94.5 H |

Primary Examiner—Ernest T. Wright, Jr.

[57] ABSTRACT

A laser eraser for erasing errors from a written document and adapted with means to be permanently incorporated on a typewriter is described. The device comprises a laser instrumentation head containing a laser generator, a power supply unit to energize said laser generator, and a conduit means connecting the laser instrumentation head to the power supply unit for electrical communication therebetween and for electronic and fluid cooling of the laser generator in said laser instrumentation head.

17 Claims, 13 Drawing Figures

PATENTED JAN 22 1974 3,786,907
SHEET 1 OF 2
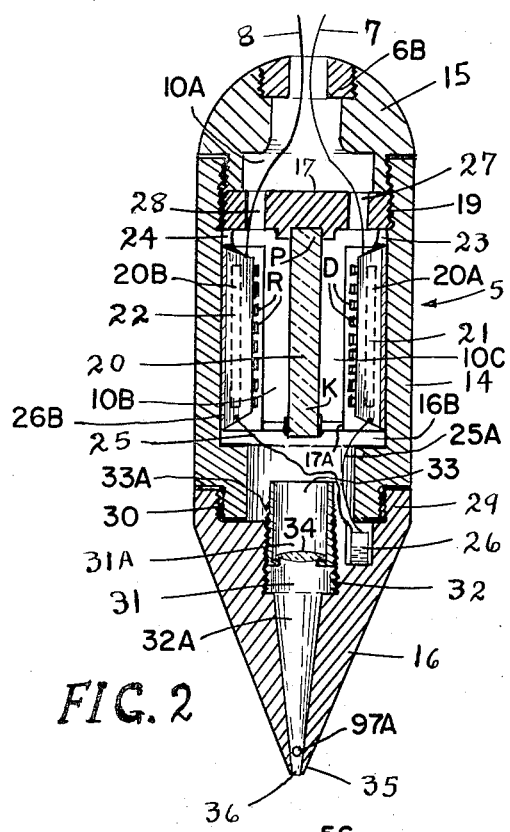
FIG. 2
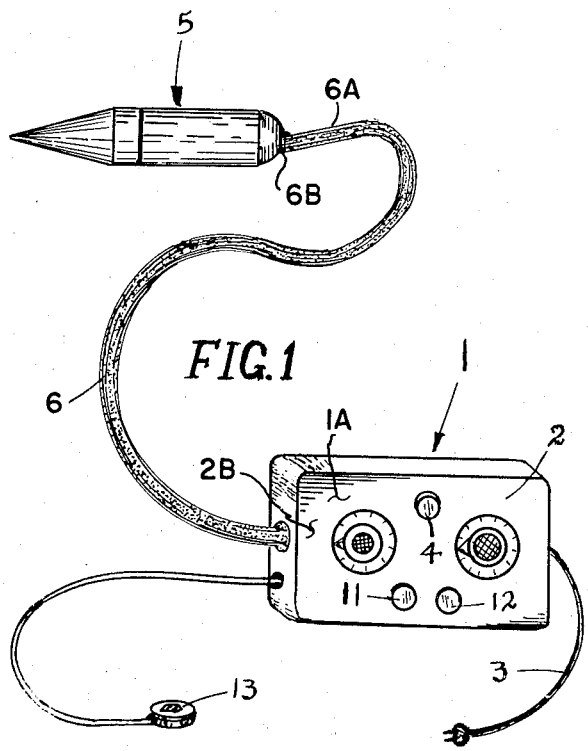
FIG. 1
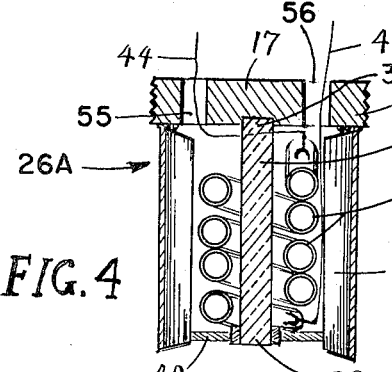
FIG. 4
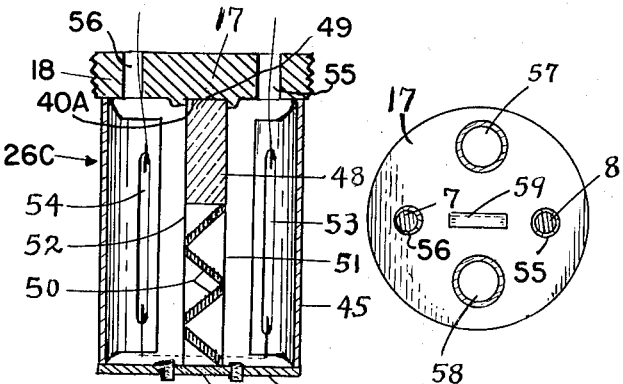
FIG. 5   FIG. 6
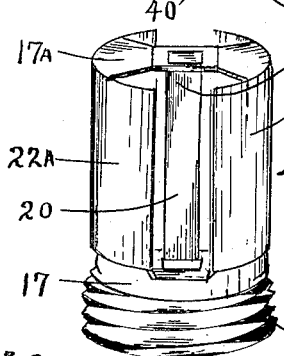
FIG. 3
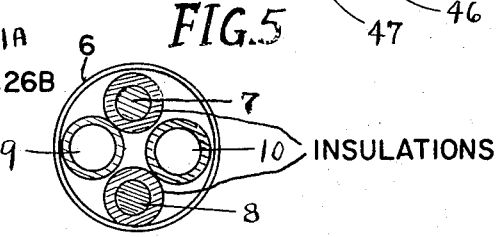
FIG. 7
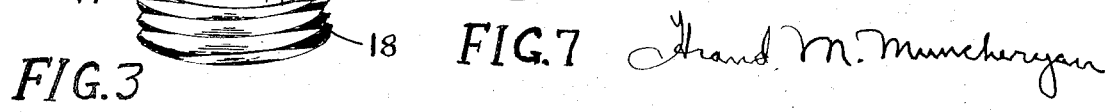

PATENTED JAN 22 1974 3,786,907

LASER ERASER FOR A TYPEWRITER

The present invention relates to devices for erasing error characters from written documents and more particularly it is concerned with a device of the character employing a laser beam for erasing.

This invention relates to an improved embodiment of the laser described and claimed in application Ser. No. 536,030, filed by me in the United States Patent Office on Mar. 21, 1966, now U.S. Pat. No. 3,464,534. In that U.S. Pat. No. 3,464,534, a laser eraser is disclosed in which the laser generator is self-exciting, that is, the laser action occurs by passing a current through the lasing material, which is an array of laser diodes. In the present invention, the lasing material is optically pumped by an external radiant pumping means, which is an electromagnetic radiation, such as another laser beam or a visible light beam. In at least one of the embodiments of the invention, a laser beam amplifying means is included which amplifies the laser beam transmitted therethrough from an adjacently located laser-generating element. Furthermore, a compact power supply which energizes the radiant pump as well as the lasing material is adapted with means to be attached on the side of a typewriter, and the laser erasing head is incorporated on a slide bar secured on the upper back side of the typewriter and is movable along the entire length of the printing area, so that erasing of error characters is easily and effectively accomplished. For additional advantage, the physical configurations of the lasing elements have been designed so that the elements will emit the maximum laser radiation per given amount of energy supplied by the optical pump.

With the above-stated advantages in view, an object of the invention is to provide a high-intensity, lightweight, small, and compact laser eraser which utilizes a minimum of input energy to produce a maximum of laser radiation, thus making it possible to utilize a physically small power supply unit that is easily portable as well as attachable to a typewriter without screws or cumbersome fastening devices.

A further object of the invention is the provision of a radiant pump which in itself is a lasing material using low energy and producing a radiation of a wavelength to which the lasing material being optically pumped is extremely sensitive and, therefore, generates a greater amount of laser radiation than when pumped by an equal-energy visible light, thus increasing the efficiency of laser emission from the laser material.

A still further object of the invention is to provide, in one embodiment of the invention, two different lasing elements energized simultaneously by a visible light pump, wherein one of the lasing elements emits a laser radiation and projects it through the second lasing element, thereby causing a cumulatively amplified laser emission beam.

Another object radiation the invention is to provide a lightweight and high thermoconductive parabolic reflector surrounding the radiant pumping means whereby to concentrate all the pump radiation on the laser-generating element so as to produce the maximum possible laser ra3iation from said element.

One other object of the invention is to form the laser-generating (lasing) element of a rod having rectangular configuration, whereby the optical pump energy absorption increases, internal crystal strains due to heat from the optical pump energy decrease, and thermal conduction increases because of increased surface area as against a round rod.

A further object of the invention is to provide at least three of the species disclosed with a cooling medium, such as an electronically cooled heat sink, a gas or a liquid, since heat is produced during the optical pumping and laser generation; this heat must be removed in order to retain the normal efficiency of emission of the lasing elements.

Other objects and advantages of the invention will become more apparent by a reference to the specification taken in conjunction with the accompanying drawing, wherein like numerals refer to like parts throughout the several views of the invention, and wherein:

FIG. 1 is a perspective view of the invention, showing the laser instrumentation (erasing) head, the power supply unit, and a connecting conduit means therebetween.

FIG. 2 is a sectional view taken at the principal long axis of the laser instrumentation head.

FIG. 3 is a perspective view of the framework and laser rod of laser-generating section contained in the embodiment shown in FIG. 2.

FIG. 4 is a sectional view of a modified form of the laser-generating section which can be employed, in the head shown in FIG. 2, interchangeably with that shown in FIG. 3.

FIG. 5 is a sectional view of another modified embodiment of the laser-generating section, incorporating a dual lasing element arrangement for laser beam amplification.

FIG. 6 is a top view of the laser-generating sections shown in FIGS. 3, 4, and 5.

FIG. 7 is the cross-sectional view of the connecting conduit means located between the power supply unit and the laser instrumentation head, showing the positions of the cooling medium ducts and the electric conductors from the power supply unit.

Figure 13:
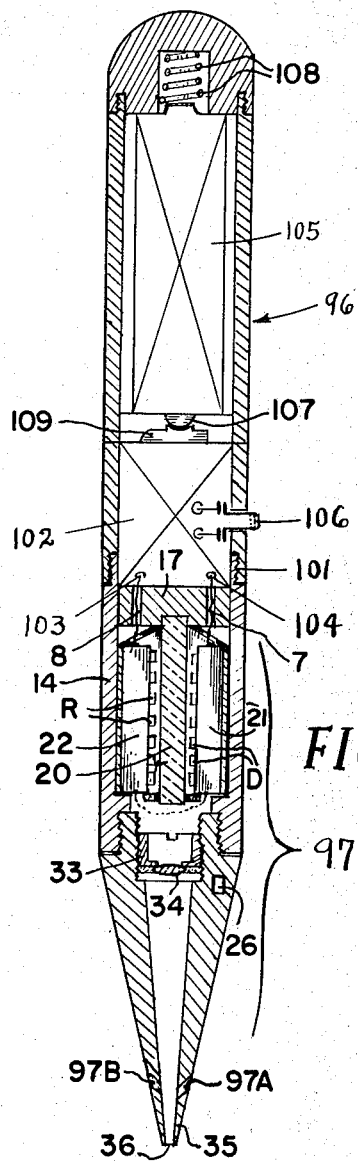
FIG. 13 is an axial sectional view of a self-contained battery-operated laser eraser incorporating the laser instrumentation head shown in FIG. 2.

Referring now to the drawing, FIG. 1 shows a power supply unit 1 with an instrument panel 2 and receiving electric power from an external 115-volt 50/60 cycle current source through the cord 3 when the main switch 4 is turned on. A laser instrumentation or working head 5 is connected to the power supply unit 1 through a connecting conduit means 6 which contains two insulated electric conductors 7 and 8 (see FIG. 7) and cooling system conduits 9 and 10 therein. The cooling medium is conducted by a conduit, for instance, conduit 9, into chambers 10A, 10B, and 10C and returned by way of conduit 10. The end section 6A of conduit 6 terminates at 6B so that the ducts 9 and 10 open into chamber 10A. The switches 11 and 12 are connected in series with a foot switch 13, so that all three switches, 11, 12, and 13, must be simultaneously closed in order to trigger a laser beam from the system; the reason for the arrangement is to prevent accidental laser triggering of the equipment by inadvertent handling or accidental depression of the foot switch 13 by the operator.

The laser instrumentation head 5 comprises a multi-sectional housing having a cylindrical section 14, a cap section 15, and a coniform section 16. The cylindrical section 14 is provided with a cylindrical chamber 16B which contains a laser-generating section 26B (FIG. 3) comprising a base 17 having peripheral screwthreads 18 mating with threads 19 formed in the cylindrical section 14. Attached at its end P to the base 17 and centrally thereof is an elongated rod of lasing element 20 having a circular or rectangular cross-sectional configuration, a rectangular configuration being preferred in the present case. Two sets of laser pumping means 21 and 22 are positioned diametrically opposite with respect to the lasing element 20 and are supported on the base 17 at connection points 23 and 24, respectively. The lasing element 20 is supported at its opposite end K by a plate member 17A. The laser pumping means 21 and 22 are electromagnetic energy sources, such as an array of laser diodes R and D, illustrated by square projections pointing centrally to the lasing element 20. The laser pumping means 21 and 22 are electrically connected in series by means of jumpers 25, 25A joining the lower ends thereof through a mercury switch 26. To protect the operator from stray laser radiation, the laser head 5 must be positioned vertically upon a character to be erased before the mercury switch 26 will close the circuit to the laser triggering foot switch 13, shown in FIG. 1. The other ends of the laser pumping means 21 and 22 are respectively connected to the conductors 7 and 8, which, after passing through the apertures 27 and 28 are led through the conduit 6 to the power supply unit 1. Thus, it must be noted that four switches, 11, 12, 13, and 26, must be closed concurrently in order that the laser emission can occur from the system; this feature makes the operation of the system highly safe to the operator. Cylindrical reflectors 21A and 22A respectively surround the laser pumping means 21 and 22 to concentrate the optical pump energy upon the lasing element 20.

The coniform section 16 of the laser instrumentation head 5 is attached at the base section 29 thereof to the cylindrical section 14 by screwthread means 30. Internal to the coniform section 16 is a cylindrical chamber 31; in the peripheral aspect of chamber 31 are screwthreads 32 formed on the internal wall surface of coniform section 16. A lens holder 33 with a chamber 31A is provided at one end with a lens 34 transversely disposed in the axial relation of said holder 33. The lens holder 33 is provided with screwthreads 33A on its external surface to mate with threads 32 of the coniform section 16. By rotating the lens holder 33 clockwise or counterclockwise, the lens 34 moves up or down within the chamber 31; thus the position of the laser beam through the lens 34 can be adjusted to a desired point on the principal axis of the coniform section 16, thus varying the focus size of the incident laser beam. A conical chamber 32A extends from chamber 31 to the tip 35 of the coniform section 16 and terminates in an opening 36 for laser beam exit.

The laser-generating section 26A shown in FIG. 4 comprises a central laser-generating element 37 supported at one end 38 thereof by the base section 17 and at the other end 39 by an annular supporting means 40 attached at its periphery to a semicircular reflector 41 surrounding the laser pump or flashlamp 42. The conductor leads 43 and 44 extend from the flashlamp 42 to the power supply 1 which furnishes the energizing power to the flashlamp 42. The laser element 37, as well as the laser element 20, is one of the class of the solid-state lasing rods characterized by ruby, neodymium-doped glass, yttrium-aluminum garnet, or a similar lasing element.

FIG. 5 illustrates a further modified embodiment of the laser-generating section 26C which comprises the base 17 having a cylindrical housing 45 closed at the lower end by an annular plate 46 and a transparent window 47 disposed centrally thereof; the window 47 may be made of glass, sapphire, germanium, or any other material that is highly transparent to laser radiation. A laser rod 48 of a rectangular cross-sectional configuration is positioned centrally to the housing 45 and is supported at one end 49 by the base section 17. At the opposite end of rod 48 is a plurality of lasing plates 50 which are arranged between thin glass or sapphire plates 51 and 52 and supported thereby at 45-degree angles thereto. The lasing plates 50 may be made rectangular, or elliptical if the lasing rod 48 is round in cross-sectional configuration.

The laser pumps (flashlamps) 53 and 54 energize both the laser rod 48 and the lasing plates 50 simultaneously. The function of the lasing plates 50 is to amplify the laser beam from the lasing rod 48, since the plates 50 are lasing type, too. The end surface 40A of lasing rod 48 is heavily coated with a reflecting material to form a mirror. The inner surface of window 47 is 'ightly coated with a mirror material, so that more than 90 percent of the laser radiation traverses therethrough. The two mirror surfaces and the laser elements 48 and 50 form an oscillating or resonating cavity for the laser beam before it is amplified and projected through the window 47. This arrangement of two types of lasing elements 48 and 50 physically connected in series and optically pumped by flashlamps 53 and 54 produces laser oscillations that are in phase and devoid of beat pulsations, as they would be if the lasing rod 48 and the plates 50 were optically pumped individually.

The top view of the base section 17 shown in FIG. 6 illustrates the positions of the openings 55 and 56 for the passage of electric conductors 7 and 8 (43 and 44) to and from the laser-generating section 26C; the openings 57 and 58 are respectively for the inflow and outflow of a cooling medium to and from the laser-generating section 26C. The cooling medium, a gas or a liquid, is contained in a conventional reservoir with a motor-driven pump (not shown) located at location 1A inside the power supply unit 1; the cooling medium may be nitrogen, heavy hydrogen, dimethylsulfoxide, Freon, or any other fluorocarbon material, or water. Since in operation the laser instrumentation head 5 will be held vertically for the mercury switch 26 to operate, the heated fluid will rise to chamber 10A and is carried away by duct 10, while cool incoming fluid will flow to the bottom chambers 10B and 10C; if the cooling medium is gas the circulation and cooling will be by convection, since the fluid is forced through duct 9 into the elongated housing 5 and returned through duct 10 to the reservoir located within the power supply 1 housing. The heat from the fluid (being minute) is radiated from the reservoir and surrounding structures at the rate it is produced.

Figure 10:
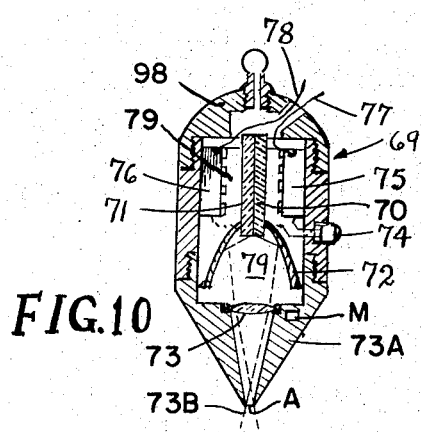
FIG. 10 is an axial sectional view of a modified laser instrumentation head.

An electric cooling device, shown by broken lines at 20A and 20B of FIG. 2 may also be incorporated within the base sections of diode arrays 21, and 22, and 75 and 76 (the latter are not shown in FIG. 2 for clarity); they receive current from the power supply section 1 through the leads 7 and 8 of FIG. 2 and 77 and 78 of FIG. 10, respectively. Such a device employs the well known Peltier Effect, and the minute heat evolved during laser action is dissipated by the housing material of laser instrumentation head 5 by conduction and and radiation. Centrally formed in the top of the base section 17 is a rectangular recess 59, which serves for receiving the point of an externally introduced screwdriver to rotate the base section 17 during mounting and unmounting the laser-generating section 26C from the laser instrumentation head 5.

Figure 8:
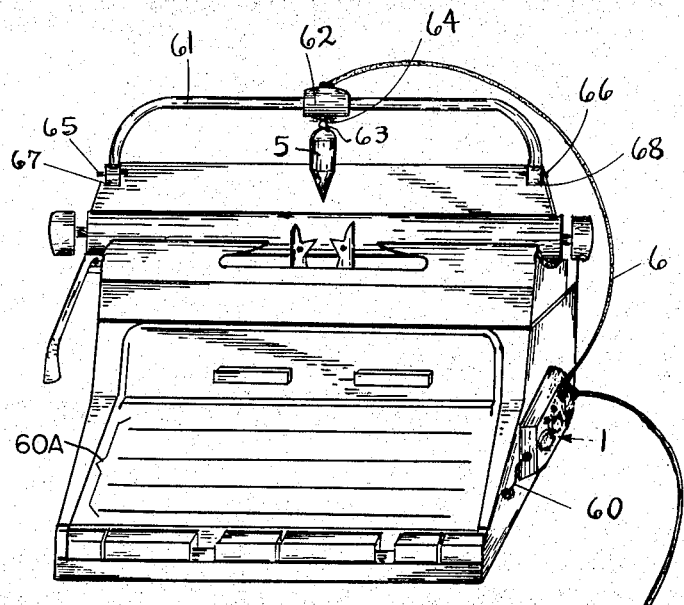
FIG. 8 shows a partial front-and-side view of a typewriter and the manner of attachment for operation of the laser eraser thereon.

FIG. 8 illustrates the manner of permanently mounting the laser eraser on a typewriter and its application thereon. The power supply unit 1 is attachted on the side of the typewriter by a magnetic or suction-cup means (located on the undersurface 2B of the unit, not shown), and the electric cord 60 (or, cord 3 in FIG. 1) is connected to the circuit of the typewriter in case it is an electric typewriter; if not, the terminal plug of the cord 60 (cord 3 in FIG. 1) is inserted into a 115-volt AC outlet. If desired, the power supply unit 1 may also be incorporated within the housing of the typewriter during manufacturing; the control units then may be mounted externally to the housing of the typewriter.

Figure 9:
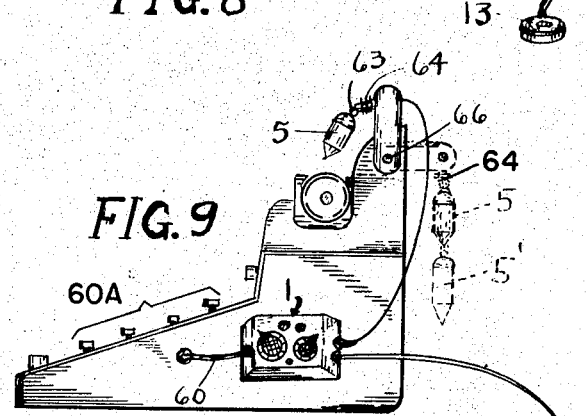
FIG. 9 is the side view of the typewriter showing the manner by which the laser eraser is put away after use, behind the typewriter.

The laser intrumentation head 5 is mounted on a slide bar 61 through an attaching means 62, which is manually movable along the slide bar 61, thereby making it possible for the laser instrumentation head 5 to move to any point on the printing area for making erasures. A universal joint 63 with a spring 64 attached to the slide bar 61 permits the movement of the head 5 in a 360 degree plane, the spring 64 further permitting the head 5 to be extended, by pulling, several inches from the attaching means 62, as illustrated in the side view of the typewriter shown in FIG. 9. Furthermore, the laser instrumentation head 5 may be swung back so as to permit the slide bar 61 to be used as a typing-paper rest. The slide bar 61 is mounted, on the typewriter, by its ends 65 and 66 which are provided with sleeves 67 and 68, respectively; the sleeves 67 and 68 enable the slide bar 61 to be swung behind the typewriter when the head 5 is not in use, as illustrated in FIG. 9 by the broken lines. The sleeves 67 and 68 are provided with a conventional detent means (not shown) so that the slide bar 61 snaps and locks in each of the positions shown in FIG. 9. The four horizontal lines 60A on the typewriter represent the four rows of conventional typewriter keys.

Figures 11, 12:
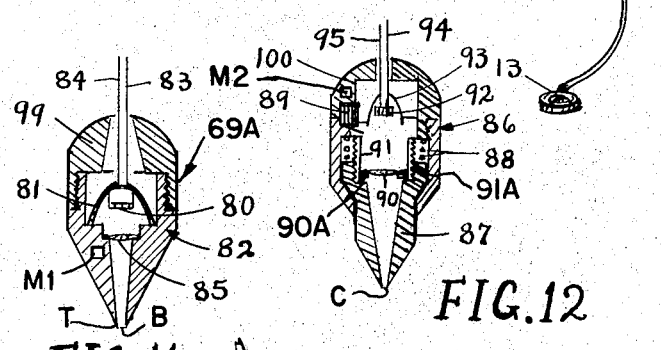
FIG. 11 is a sectional view of a still further modified embodiment of the laser instrumentation head.
FIG. 12 is another modified embodiment of the laser instrumentation head containing an internal laser-triggering switch and an adjustable lens holder.

The instrumentation head 5 may be one of any of the laser working head embodiments shown in FIGS. 2, 10, 11, 12, or 13. Each of the heads 69, 69A, or 86, shown in the respective FIGS. 10, 11, or 12 is to be provided with a mercury switch at points M, M1, and M2, respectively, and connected to the power supply unit 1 through the respective conductors, in series, feeding current to the laser elements in the respective housings, the conductor connections being the same as in FIG. 2.

In the modified embodiments of the invention shown in FIG. 10, 11, 12, and 13, the incorporation of a mercury switch during manufacturing of the laser eraser includes the same connections scheme as the one (switch 26) shown in FIG. 2. That is, the conductors 77,78 in FIG. 10, conductors 83,84, in FIG. 11, conductors 94,95 in FIG. 12, and conductors 7,8 in FIG. 13 are connected in series with the respective mercury switches positioned at points M, M1, M2, and 26 in the respective housings of 69, 69A, 86, and 96. Accordingly, the points M, M1, M2, and 26 are illustrative only of the positions of mercury switches. For clarity, the comple switch connections of the individual mercury switches are left out from FIGS. 10, 11, 12, and 13. Considering the case of FIG. 10 for an example, the mercury switch at M would be in series connection with the switch means 74, the lasing-pump elements 75,76, and conductors 77,78. The laser working head 69 is generally similar to head 5 shown in FIG. 2, with the exception that the lasing element is made of two rectangular plates 70 and 71 cemented together with a transparent optical cement; the cement serves as transparent mirror therebetween. Also, a parabolic reflector 72 is mounted at the laser beam projecting end. The laser beam is focused by means of the lens 73, which receives a parallel beam of laser radiation from the reflector 72 as well as the lasing plates 70 and 71. As illustrated in FIG. 10, the laser beam converges to a point within the coniform distal end section 73A, axially thereof, so that a divergent laser beam as at 73B becomes incident on the error character to be erased. A switch means 74 triggers (energizes) the laser radiation by closing the circuit to the lasing pump elements 75 and 76, which are arrays of laser diodes, similar to those shown on laser-pumping means 22 and 21. The conductors 77 and 78 transmit the energizing current to the elements 75 and 76 from the power supply unit 1. The lasing elements 70 and 71 may be made of similar or dissimilar lasing elements. The advantage of a two-piece cemented lasing rod is to utilize the laser-pump-heat reflecting capability of the interface formed between the two cemented crystals, thus increasing the laser emission and decreasing the heat effect on the crystal by reflection of heat by the interface, thus cooling the crystal. The collected heat within the chamber 79 is dissipated through the thermo-conductive walls of the laser instrumentation head 69 housing.

FIG. 11 represents a cross-sectional view of another modified embodiment of the laser instrumentation head 69A in which a laser-generating element 80 comprising either a single laser diode or an array of laser diodes is positioned at the focal point of a parabolic reflector 81 supported by the coniform section 82 of the laser instrumentation head 69A. The laser-generating element 80 may be one of the lasing materials known as gallium arsenide, gallium phospho-arsenide (GaAsP), gallium-aluminum arsenide, indium phosphide, indium antimonide or a similar lasing material; the laser-generating element 80 receives current energy through the conductors 83 and 84 from an external source, such as the power supply unit 1 shown in FIG. 1, and produces a laser beam which is converged by means of the lens 85 for projection thereby on a workpiece positioned at the tip T of the instrument head 69A.

FIG. 12 is a cross-sectional view of another modified form of the laser instrumentation head designated by 86, which contains a coniform section 87 biased by the spring 88. When the section 87 is moved inward by pressure exerted at the tip thereof during operation of the eraser, the coniform section 87 closes a normally open switch means 89. Upon release of the pressure, by moving the head 86 away from the workpiece, the section 87 moves back to normal position by said spring 88, thus opening the switch means 89. By incorporating the switch means 89 within the laser instrumentation head 86, operator safety is achieved by avoiding stray laser radiation by an accidental closing of the switch 89 if it were positioned externally to the laser instrumentation head 86.

A lens 90 is mounted on an inwardly projecting flange 90A in a lens holder 91 which is adjustably disposed within the housing of laser instrumentation head 86. The lens holder 91 has a similar screwthread adjustment means 91A as lens holder 33 for adjusting the focus of the laser beam projected from the lens 90. The lens 90 receives laser radiation from the laser-generating crystal 92 positioned at the focal point of a parabolic reflector 93. Each of the three embodiments shown in FIGS. 10, 11, and 12 contains a laser radiation exit aperture A,B,C, respectively, at the tip of the respective conical sections 73A, 82, and 87. The laser crystal 92, which may be a diode or an array of diodes similar to those previously stated, is energized by an external current, such as a power-supply-unit current, transmitted thereto through conductors 94 and 95.

A self-powered laser eraser is shown in FIG. 13, wherein the housing 96 contains a laser instrumentation head section 97 similar to that shown in FIG. 2. However, any one of the laser instrumentation heads 69, 69A, or 86, respectively, shown in FIGS. 10, 11, or 12, can replace section 97, after first having been detached from its respective cap member 98, 99, or 100 and then fastened to the housing 96 at point 101; the electric conductors (77,78), (83,84), and (94,95) from the respective laser-generating elements (75,76), 80, and 92 in the laser instrumentation heads 69, 69A, and 86, are connected to the power supply section 102 at points 103 and 104. A rechargeable battery 105, 9 to 24 volt capacity, is located within the housing 96 to furnish the necessary energizing current to the power supply section 102 at point 107; numeral 108 is a spring means which presses against battery 105 for making a good electrical contact between points 107 and 109. A manually-operated pushbutton switch means 106 is incorporated in the wall of the housing 96 and is series-connected in the laser energizing power supply section 102; this switch 106 is used to trigger the laser radiation by closing the energizing circuit thereof.

Numerals 97A and 97B designate apertures for egress of effluents due to the laser-beam interaction with the error character being erased by the laser beam.

In operation, the laser instrumentation head, shown in any of the figures in the drawing, is placed almost perpendicularly upon a character or line to be erased and the laser radiation is triggered by the respective manner described above. This action instantly removes the character by vaporizing it. Since the laser beam is reflected from the white background paper, the latter is unaffected by the laser beam. Furthermore, since the power supply can be made with a pulse-forming circuit therein so that only one pulse of laser radiation is triggered upon closing the laser energizing switch; this laser pulse duration can also be limited so that only a predetermined amount of laser pulse energy is delivered to the character for vaporization.

I claim:

1. A laser eraser for attachment to a typewriter and for application thereon, said laser eraser comprising: a laser instrumentation head with a power supply section having therefor a series of control means including a fluid means to provide energizing current to said laser intrumentation head; said laser instrumentation head comprising an elongated housing accommodable in the palm of a hand, said elongated housing being provided at one end thereof with a receptacular end section having thereon and centrally thereof an attaching means with a resilient means extending therefrom for attachment of said laser instrumentation head to a typewriter, with said resilient means permitting free movement of said laser instrumentation head about the typewriter, a laser generator including a radiant source with optically coupled dissimilar lasing elements disposed in said elongated housing and means disposed within said receptacular end section thereof for providing a current to said laser generator through said series of control means including a fluid means; the opposite end of said elongated housing having a detachable distal end section terminating in a tip with an opening centrally formed therein and extending into said elongated housing, said tip including an exit means therein; at least one of said series of control means including fluid means being a position-sensitive element and disposed within said laser instrumentation head and operable in response to manual positioning of said laser instrumentation head vertically upon an error character located on the printing area of a typewriter, by which manipulation an energizing current is supplied from the power supply section to said laser generator to produce an emission of a laser radiation therefrom; said detachable distal end section having therein a cylindrical chamber continuous therewith and tapering to the opening centrally formed in said tip to form a conical chamber therein, and an optical means disposed in said cylindrical chamber and being internally adjustable within said detachable distal end section and secured thereto, axially thereof, to receive a laser radiation from said laser generator, to converge said radiation to a focal point centrally within said conical chamber of said detachable distal end section and to project the laser radiation from said focal point divergently upon a typed error character through said tip in vertical abutment with the error character, for erasing the error character by interaction thereof with the laser radiation incident thereupon, said exit means in said tip permitting the escape therethrough of effluents produced by the interaction between the error character and the laser radiation; and, endothermic means provided in said elongated housing and operatively connected to said power supply section for producing temperature conditioning within said elongated housing.

2. A laser eraser for a typewriter as defined in claim 1, wherein said series of control means including a fluid means for said power supply section providing energization current to the laser generator in said laser instrumentation head are normally open switch members connected together in series, a part of which switch members being located in said power supply section and the other part of the switch members including the fluid means being disposed in said laser instrumentation head for actuation thereon.

3. A laser eraser for a typewriter as defined in claim 1, wherein said power supply section for said instrumentation head is a discrete unit having therein an electric supply circuit receiving current from an external source, a fluid supply means, and a conduit means extending from said power supply section to said laser instrumentation head and attached thereto at the receptacular end section thereof, said conduit means including therein electric cables and fluid conductors respectively originating from said electric supply circuit and said fluid supply means and terminating respectively in the laser generator and in the elongated housing of said laser instrumentation head to transmit thereinto respectively an electric current and a cooling fluid for utilization therein.

4. A laser eraser for a typewriter as defined in claim 1, wherein said receptacular end section of the elongated housing for said laser instrumentation head contains a rechargeable battery and adjacent thereto and within said elongated housing a power supply section for receiving an electric current from said rechargeable battery to provide energization current to the laser generator in said laser instrumentation head.

5. A laser eraser for a typewriter as defined in claim 1, wherein said radiant source with optically coupled dissimilar lasing elements of said laser generator comprises light emitting members and at least one of which is a laser rod comprising a multiple-section structure and the sections thereof being held together by a radiation reflective interface to reduce thereby the thermal effects in said multiple-section structure and to eliminate stress concentrations within said laser rod by reflecting therefrom the thermal radiation incident on said radiation reflective interface from said light emitting members and thereby increasing the laser emission from said laser rod.

6. A laser eraser for a typewriter as defined in claim 1, wherein one of the optically coupled dissimilar lasing elements in said laser generator disposed within said elongated housing is a multiple-element 'asing member disposed axially within said elonGated housing and being in optical couplement with a plurality of radiant elements disposed therein in adjacent relation to said multiple-element lasing member for cumulative stimulation of a laser radiation from said multiple-element lasing member.

7. A laser eraser for a typewriter as defined in claim 1, wherein said laser generator in said elongated housing comprises three types of radiant sources, two of which are lasing types and aligned together at their principal axes within said elongated housing for mutual interaction of their laser radiation, and the third type of radiant source funnishes optical pumping energy to the first two types of radiant sources to collectively produce lasing action therein and thereby developing a cumulative laser radiation by mutual interaction of the laser emissions therein for operation of the laser eraser.

8. A laser eraser for a typewriter as defined in claim 1, wherein said optical means in said cylindrical chamber comprises a tubular lens holder with one end thereof having an inwardly projecting flange and a lens seated on said flange, the opposite end of said lens holder projects into said elongated housing and is movable thereinto with said distal end section upon positioning said elongated housing vertically on a workpiece and exerting a vertical pressure thereon; and, wherein one of said series of control means including a fluid means is disposed in said elongated housing in contacting relation to said tubular lens holder upon movement of said lens holder thereto, said one of said series of control means including fluid means being in series connection with the fluid means disposed in said elongated housing, for actuation of said series of control means including a fluid means upon contacting of said one of said series of control means including a fluid means by the lens holder by movement of said distal end section in vertical relation into said elongated housing.

9. A laser eraser for a typewriter as defined in claim 1, wherein said position-sensitive element disposed within said laser instrumentation head is a normally open mercury switch member with electrodes arranged therein to contact the mercury and close said mercury switch member upon positioning of said laser instrumentation head in a vertical plane, as during an erasing operation of the laser eraser.

10. A laser eraser for a typewriter as defined in claim 1, wherein said position-sensitive element disosed in said laser instrumentation head is connected in series with the current supplied to the laser generator from the power supply section of said laser instrumentation head to trigger said laser generator.

11. A laser eraser for a typewriter as defined in claim 1, wherein said optical means disposed in said cylindrical chamber and being internally adjustable within said detachable distal end section comprises a lens holder with a lens therein, and an axially adjustable attaching means provided on said lens holder to adjustably secure said lens holder to the wall of said cylindrical chamber for permitting internal adjustment of said lens, whose position from the tip of said detachable distal end section defines the position of the focal point of a laser radiation within said detachable distal end section and thereby the focus size of the laser beam incident on an error character.

12. A laser eraser for a typewriter as defined in claim 1, said laser generator disposed in said elongated housing is a replaceable unit and comprises a circular base section with attaching means formed on its periphery for attachment thereof to said elongated housing, a lasing element having a plurality of rectangular laser emitters centrally disposed on said circular base section and supported thereon by thin plates of sapphire in axial relation thereof, a radiant source disposed peripherally to said rectangular laser emitters to incite laser action therein, and reflecting means surrounding said radiant source and secured to said circular base section for redirecting to said laser emitters the radiation emitted thereby for developing a cumulative laser radiation therein.

13. A laser eraser for a typewriter as defined in claim 1, wherein said endothermic means provided in said elongated housing and operatively connected to said power supply section is a fluid, for temperature-conditioning the contents of said elongated housing.

14. A laser eraser for a typewriter as defined in claim 1, wherein said attaching means with a resilient means secured to said receptacular end section of said elongated housing is a universal joint with an extensible spring means provided thereon and attachable to a typewriter for unrestricted manipulation of the laser instrumentation head thereon by permitting said laser instrumentation head to rotate in a 360 degree plane on said universal joint and thereby to be positioned vertically by extension of said extensible spring means on a workpiece mounted on the typewriter.

15. A laser eraser for a typewriter as defined in claim 1, wherein said exit means in the tip of said detachable distal end section consists of a plurality of radial apertures formed in said detachable distal end section adjacent to said tip and positioned in an inclining relation to the principal axis of said distal end section to permit therethrough the escape of the effluents projecting from the workpiece interacted with a laser radiation and thereby to prevent contamination, by the effluents, of the optical means disposed within said detachable distal end section.

16. A laser eraser for a typewriter as defined in claim 1, wherein said series of control means including a fluid means for the power supply section comprises two normally open switch members connected in series, one of said switch members is disposed in the wall of the elongated housing of the laser instrumentation head and is operable manually thereon and the other switch member is disposed in the distal end section of said elongated housing and is operable by gravity upon vertically positioning the tip of said laser instrumentation head on a workpiece, thus permitting the energization of the laser generator disposed in said elongated housing only upon simultaneous closing of both of said switch members.

17. A laser eraser for a typewriter as described in claim 1, wherein said laser generator comprises a circular base section, a laser rod secured at one end thereof to said circular base section and at the other end to a plurality of lasing plates arranged at 45-degree angles to each other with their centers aligned with the principal axis of said laser rod, a radiant source disposed axially and adjacently to both of said laser rod and said plurality of lasing plates to optically stimulate said laser rod and said plurality of lasing plates to emission of laser radiations, and a reflector means is disposed on the periphery of said radiant source and supported on said circular base section to reflect radiation from said radiant source as well as to redirect laser radiation incident thereon from said laser rod by reflection from the surfaces of said plurality of lasing plates arranged at 45-degree angles to produce laser oscillations and interaction therein between the laser radiation from said laser rod and the laser emissions from said plurality of lasing plates, resulting in a cumulative laser radiation which projects axially therethrough.

* * * * *